(12) United States Patent
Moody et al.

(10) Patent No.: US 7,294,820 B2
(45) Date of Patent: Nov. 13, 2007

(54) NIGHT VISION SYSTEM INCLUDING FIELD REPLACEABLE IMAGE INTENSIFIER TUBE

(75) Inventors: Scott David Moody, Merrimack, NH (US); William David Schmidt, Northfield, NH (US); Robert William Firth, Allenstown, NH (US)

(73) Assignee: Insight Technology, Inc., Londonderry, NH (US)

( * ) Notice: Subject to any disclaimer, the term of this patent is extended or adjusted under 35 U.S.C. 154(b) by 264 days.

(21) Appl. No.: 10/449,734

(22) Filed: May 30, 2003

(65) Prior Publication Data

US 2004/0238724 A1    Dec. 2, 2004

(51) Int. Cl.
*H01J 31/05*   (2006.01)
*H01J 40/14*   (2006.01)
*G02B 23/00*   (2006.01)

(52) U.S. Cl. .................. 250/214 VT; 250/207; 359/407

(58) Field of Classification Search ......... 250/214 VT, 250/207; 359/399, 407, 409; 348/217.1
See application file for complete search history.

(56) References Cited

U.S. PATENT DOCUMENTS

| | | | |
|---|---|---|---|
| 4,440,476 A * | 4/1984 | Jacobson ............... 313/524 |
| 5,365,057 A * | 11/1994 | Morley et al. ........ 250/214 VT |
| 5,644,425 A * | 7/1997 | Palmer ...................... 359/409 |
| 5,737,131 A * | 4/1998 | Palmer ...................... 359/819 |
| 5,867,313 A * | 2/1999 | Schweitzer et al. ......... 359/418 |
| 5,902,996 A * | 5/1999 | Sauter .................. 250/214 VT |
| 6,075,644 A | 6/2000 | Filipovich .................. 359/407 |
| 6,201,641 B1 | 3/2001 | Filipovich .................. 359/419 |
| 6,326,604 B1 * | 12/2001 | Collins ................. 250/214 VT |
| 6,462,894 B1 | 10/2002 | Moody ...................... 359/815 |
| 6,469,828 B2 | 10/2002 | Plotsker ..................... 359/409 |
| 6,493,137 B1 | 12/2002 | Solinsky et al. ............ 359/409 |
| 6,687,053 B1 * | 2/2004 | Holmes et al. ............. 359/411 |

\* cited by examiner

*Primary Examiner*—Thanh X. Luu
(74) *Attorney, Agent, or Firm*—Grossman, Tucker, Perreault & Pfleger, PLLC

(57) ABSTRACT

A night vision goggle system is provided having an image intensifier tube that may be installed or replaced without requiring realignment of the optics. The image intensifier tube is coupled to a first locating feature that is in a predetermined relationship to the optical center of the image intensifier tube. The system includes a second locating feature that interacts with the first locating feature to position the image intensifier tube in a predetermined relationship to an optical component of the night vision system.

10 Claims, 2 Drawing Sheets

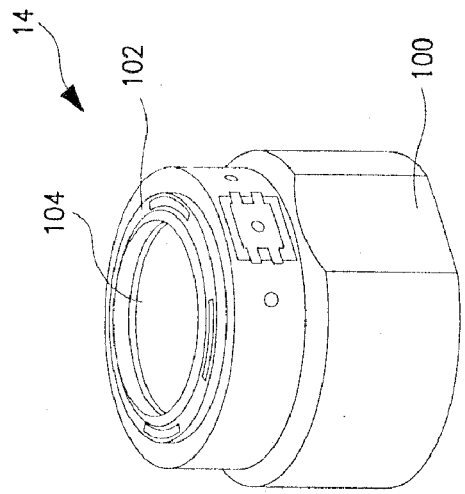
FIG. 2
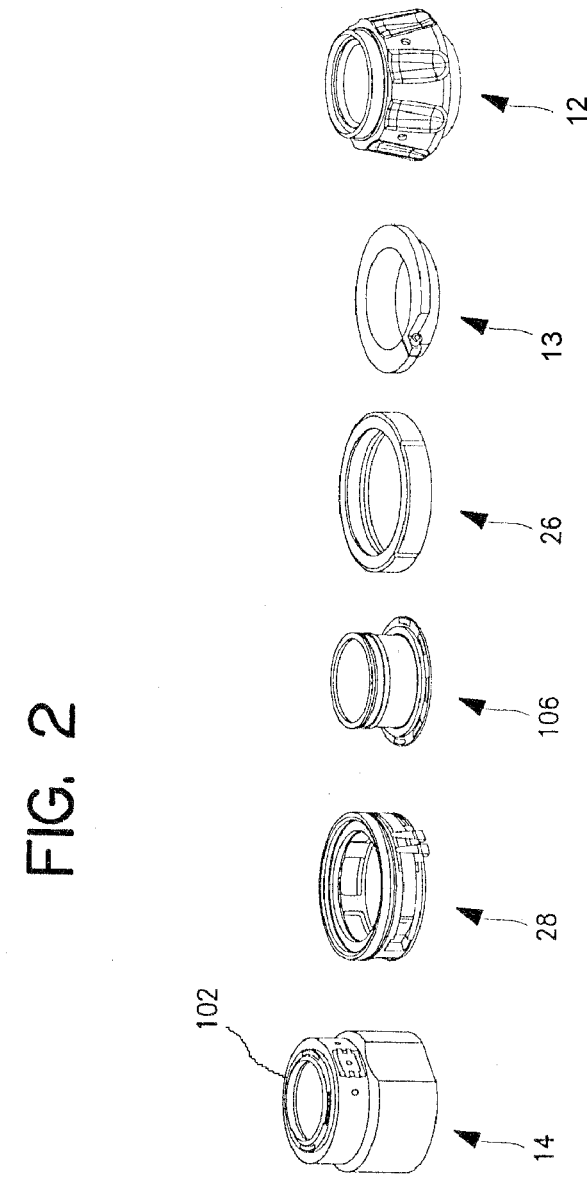
FIG. 3
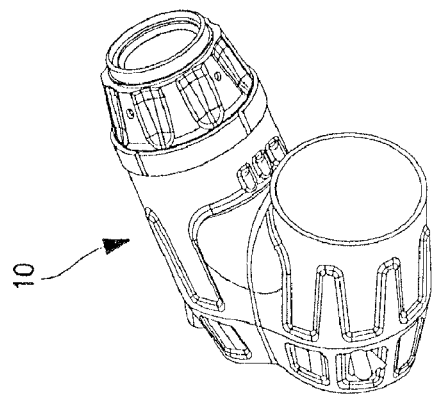

NIGHT VISION SYSTEM INCLUDING FIELD REPLACEABLE IMAGE INTENSIFIER TUBE

FIELD OF THE INVENTION

The present invention relates to a night vision systems, and in particular to a night vision system having a replaceable image intensifier tube that does not require optical realignment of the system after installation of the tube.

BACKGROUND

In conventional panoramic night vision systems two separate monocular subassemblies are provided. Each monocular subassembly includes two image channels. Each of the image channels may be provided by an objective assembly that transmits an image from a viewed object to an image intensifier tube that intensifies the luminance of the image, and outputs the intensified image to another optical assembly, such as an eye piece.

The panoramic effect of such a night vision system is achieved by angling the optical axes of each of the two image channels of each monocular relative to one another, but having partially overlapping fields of view. The separate image channels must be combined, such as by an eyepiece, to provide a wide angle field of view. In order to provide the desired panoramic view, it is necessary that the individual optical axes of the image channels be properly aligned with the image combiner. If the optical axes of the separate image channels are not properly aligned, the image may be sheared.

Unfortunately, the center of the optical axis of an image intensifier tube may vary between different image intensifier tubes. The variation in the optical center of image intensifier tubes must be accommodated during the manufacture or assembly of a panoramic night vision system in order to assure the proper alignment of the optical axis of each channel in a monocular. Conventionally, during manufacture of the night vision system the optical center of the image intensifier tube is properly aligned with the optical axis of the assembly and the image intensifier tube is secured in place in the optical assembly to prevent shifting of image intensifier tube. Securing the image intensifier tube in the optical assembly may include bonding the image intensifier tube to an adjacent component of the assembly, clamping the image intensifier tube in an axial manner using a retaining ring, etc.

While the above techniques may be able to overcome the problem of initial alignment of the image intensifier tube in the night vision system, optical tolerances are too high to allow replacement or removal of the image intensifier tube without realigning and re-securing image intensifier tube.

Accordingly, there is a need for a night vision system and method that allows self-alignment of an image intensifier tube upon replacement of the tube.

SUMMARY OF THE INVENTION

According to one aspect of the invention, there is provided a night vision system including an image intensifier tube, a first locating feature coupled to the image intensifier tube in a predetermined relationship to an optical center of the image intensifier tube, and a second locating feature adapted to interact with the first locating feature whereby the optical center of the image intensifier tube is positioned in a predetermined relationship relative to an optical component.

According to another aspect of the invention, there is provided a multi-channel monocular including an image intensifier tube. The image intensifier tube includes a locating ring disposed on a distal face of the image intensifier tube, the locating ring being concentric with an optical center of the image intensifier tube. The monocular further includes an objective assembly including a locating member adapted to mate with the locating ring of the image intensifier tube to coaxially align the optical center of the image intensifier tube with an optical axis of the objective assembly.

According to another aspect of the invention, there is provided a night vision system including an image intensifier tube and a means for positioning an optical center of the image intensifier tube in a predetermined relationship with an optical component.

According to yet another aspect of the invention, there is provided a method of aligning an image intensifier tube with an optical pathway of a night vision system, the method includes: determining an optical center of the image intensifier tube; providing a first locating feature in a predetermined relationship to the optical center of the image intensifier; providing a second locating feature having a predetermined relationship with the optical pathway of the night vision system; and coupling the first locating feature to the second locating feature thereby positioning the optical center of the image intensifier tube in a predetermined relationship with the optical pathway of the night vision system.

BRIEF DESCRIPTION OF THE DRAWINGS

Various features and aspects of the present invention are set forth herein by description of exemplary embodiments consistent with the invention, which description should be understood in conjunction with the accompanying drawings, wherein:

FIG. 2 is an enlarged view of an exemplary image intensifier tube illustrated in FIG. 1; and FIG. 3 illustrates exemplary components of the image intensifier and objective assembly.

DETAILED DESCRIPTION

Figure 1:
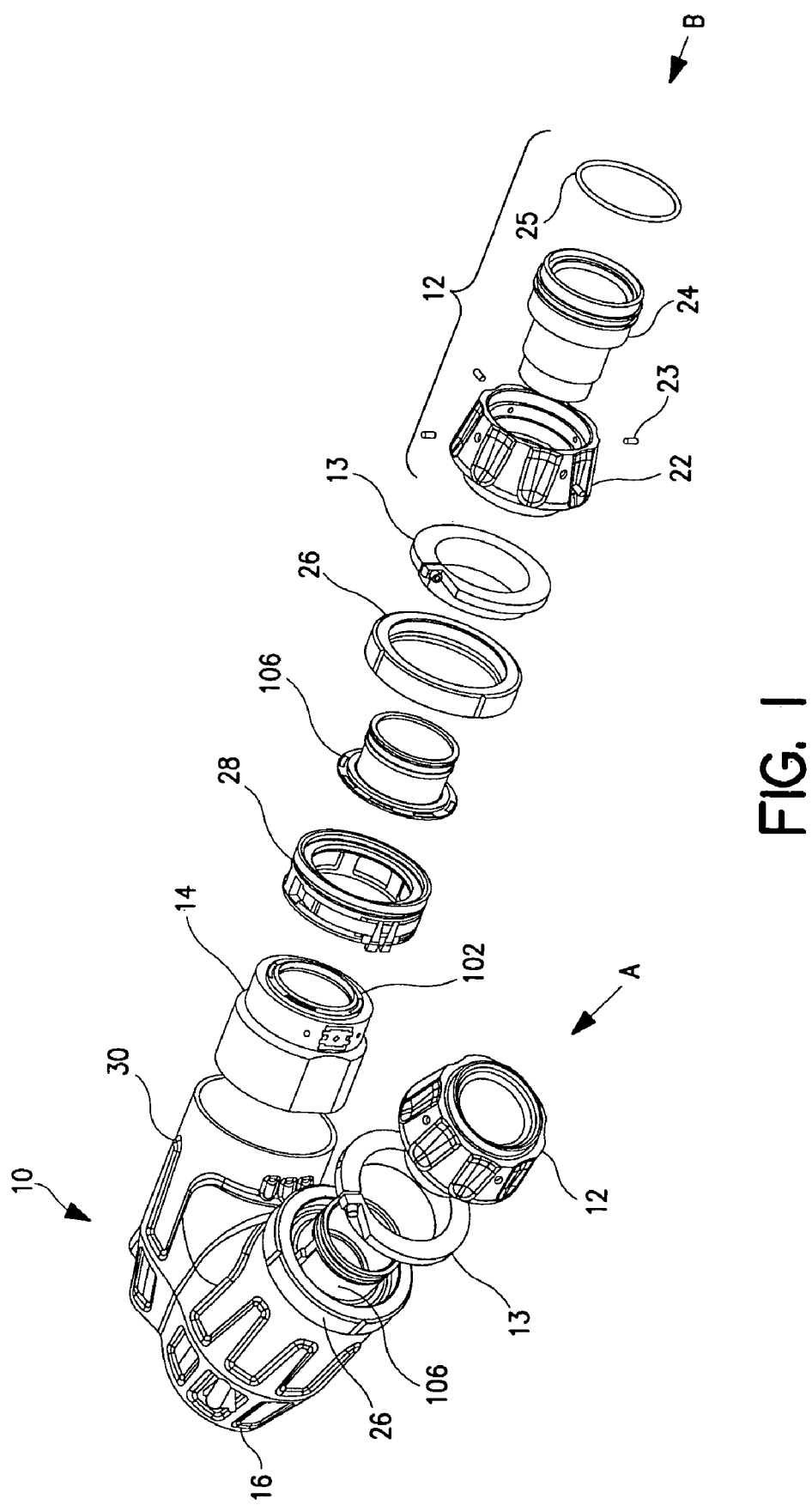
FIG. 1 depicts an exploded view of a monocular including an image intensifier tube consistent with the present invention.

For simplicity and ease of explanation, the present invention will be described herein in connection with various exemplary embodiments thereof. Those skilled in the art will recognize, however, that the features and advantages of the present invention may be implemented in a variety of configurations. It is to be understood, therefore, that the embodiments described herein are presented by way of illustration, not of limitation.

FIG. 1 illustrates an exploded view assembly of an exemplary monocular 10, such as may be used in a panoramic night vision system consistent with the invention. The illustrated monocular 10 includes two channels having respective optical axes A and B. Each channel may have a generally comparable assembly generally including an objective assembly 12, a field replaceable image intensifier tube 14, and an eyepiece 16.

Referring especially to the channel associated the optical axis B, the assembly is further broken down to illustrate exemplary subassembly and components that may be provided with each channel. In the illustrated embodiment, the objective assembly 12 may further include an o-ring 25 that seals the objective lens assembly 24 in the focus aligned focus collar 22. A number of set screws 23 may also be used to secure the objective lens assembly 24 to the focus collar 22. A focus stop ring 13 may be disposed at the proximal end of the objective assembly 12.

The distal end of the image intensifier tube 14 may be coupled to an image intensifier contact assembly 28. The contact assembly 28 may include a plurality of leaf springs that allow for at least a small degree of radial displacement of the image intensifier tube 14 relative to the contact housing 28. An image intensifier tube retaining ring 26 may be provided for retaining the image intensifier tube 14 and contact housing 28 in the monocular housing 30.

The image intensifier tube 14 and contact assembly 28 may be disposed in the monocular housing 30 and the objective assembly 12 may be secured to the housing 30. The housing 30 may include a hot shoe electrical contact (not shown), which provides power to the monocular 10, and an image intensifier tube gain adjustment (also not shown). The proximal end of the monocular 10 includes the eyepiece assembly 16, which typically houses additional optical components for combining the images provided by each of the optical channels. The monocular assembly described herein is merely an exemplary assembly, and it should be understood that the assembly and/or components may be varied without impacting the invention herein.

Turning to FIG. 2, an enlarged view of the exemplary image intensifier tube 14 is shown generally including a housing 100 that protects and contains the image intensifier element. The exemplary image intensifier tube 14 includes a first locating feature provided as a ring 102 attached to one face 104 of the image intensifier tube 14. In an exemplary embodiment, the ring 102 may be aligned concentrically with the optical center of the image intensifier tube 14. The ring 102 may be a metal, plastic, ceramic, etc. component that is attached to the face 104 using an adhesive, such an epoxy, or using numerous other techniques that will be apparent to those having skill in the art.

The ring 102 is configured to interact with a second locating feature 106 to place the optical center of the image intensifier tube 14 in a predetermined relationship with an optical component of the monocular 10, such as the objective assembly 12 or the eyepiece assembly 16, etc. Referring to FIGS. 1 and 3, the ring 102 may interact with the corresponding second locating feature 106 that may attached to the objective assembly 12, such as by being screwed onto the proximal end of the objective lens assembly 24, as shown in FIG. 1. The second locating feature 106 associated with the objective assembly 12 may be formed having an inside diameter that is sized to at least partially receive the outside diameter of the ring 102. The fit between the ring 102 and the second locating feature 106 is close enough to provide controlled alignment between the first locating feature, i.e. the ring 102, and the second locating feature. The controlled alignment between the ring 102 and the second locating feature 106 in turn provides controlled positioning of the optical center of the image intensifier 14 relative to the objective assembly 12.

In the described exemplary embodiment, the first locating feature is directly coupled to the image intensifier tube, i.e., the ring 102 is bonded to a face 104 of the image intensifier. However, the first locating feature may be indirectly coupled to the image intensifier. That is, the first locating feature may be coupled to a subsidiary component, such as the protective housing 100 or an even further removed component. It is only necessary that the first locating feature be in a predetermined relationship to the optical center of the image intensifier in order to allow subsequent alignment of the optical center relative to an optical component of the night vision system. It should be noted that "predetermined relationship" and "aligned" are not intended to restrict the invention to concentric, coaxial, or otherwise centered configurations. Such terms, as used herein, are intended only to imply a desired and controlled orientation.

In the illustrated exemplary embodiment of FIGS. 1 through 3, the first locating feature and the second locating feature act to directly align the image intensifier with an optical component of the night vision system, i.e., with the objective assembly. Additional and alternative direct and indirect associations between the first locating feature, the second locating feature and an optical component of the system may also be suitable. Other exemplary direct associations may include providing a second locating feature directly on an optical component, such as a lens of the objective assembly adjacent the image intensifier. For example, a first locating ring feature may mate with a second locating ring feature that is bonded to a proximal lens of the objective assembly.

Indirect association between the second locating feature and an optical component may also be suitable. For example, the second locating feature may be part of the image intensifier contact assembly 28, which assembly may be aligned with the objective assembly. Additional means for indirectly coupling the first locating feature to the image intensifier may include coupling the first locating feature to the image intensifier through components that are adjacent and/or interact with the image intensifier. Similarly, the second locating feature also does not have to be directly connected to an optical component of the system.

The above reference to the objective lens or objective assembly as the optical component with which the second locating feature is associated is made only for the purpose of illustration. The first and second locating features may also/alternatively be used to specifically place the optical center of the image intensifier in a predetermined relationship with the eyepiece, or any other desired optical component of the night vision system.

Consistent with the exemplary embodiment, the first locating feature may be an upstanding member that may be attached to a marginal region of a face of the image intensifier, such as the ring of the exemplary embodiment, although numerous alternative geometries may also be suitable. For example, the first locating feature may be a square, hexagonal, keyed, etc. ring that may be attached to a peripheral region of an image intensifier face so that the light reception of the image intensifier is not compromised. The second locating feature may include a protrusion, such as a ring, configured to be at least partially received within or at least partially surround the first locating feature. Numerous alternative features may also be used that will interact with the first locating feature to establish a predetermined orientation or position of the first locating feature, and therein the image intensifier.

In addition to the ring described above and with reference to the exemplary embodiment, the first and second locating features may also include a variety of mechanical elements that interact to provide the desired alignment of the features, and ultimately the desired alignment of the image intensifier. For example, the features may include coordinating protrusions and indentations in associated components. Numerous other mechanical features will be understood by those having skill in the art. Furthermore, it may be advantageous, although not necessary, to provide at least one of the first locating feature and the second locating feature with a chamfer, angled portion, etc. that facilitates assembly, engagement or interaction of the two locating features in a manner that produces the desired alignment of the optical center of the image intensifier.

Installation or replacement of the image intensifier is simplified with the system consistent with the present invention by eliminating the need to realign the optics following the installation. Referring to the illustrated embodiment of FIGS. 1 through 3, replacement of the image intensifier 14 first requires separating the objective assembly 12 from the housing 30. Once the objective assembly 12 has been removed, the image intensifier tube retaining ring 26 and the image intensifier tube 14 and contact assembly 28 may be extracted from the monocular housing 30. Thereafter, the image intensifier contact assembly 28 may be separated from the image intensifier tube 14.

The monocular 10, or more specifically the monocular subassembly corresponding to one of the optical channels, may be reassembled with a new image intensifier tube in generally the reverse order of disassembly. An image intensifier tube, corresponding in structure to the removed image intensifier tube 14, having a first locating feature 100 may be assembled to the image intensifier contact assembly 28. This may occur by inserting the distal end of the image intensifier tube 14 having the first locating feature thereon into the contact assembly 28. The contact assembly 28 stabilizes the image intensifier 14 while still allowing some radial displacement for the image intensifier 14. The assembled image intensifier 14 and contact assembly may be inserted into the monocular housing 30. With the image intensifier tube retaining ring 26 in place over the contact housing 28, the objective assembly 12 including the second locating feature 106 may be installed on the monocular housing 30. In the exemplary embodiment, installation of the objective assembly 12 places the second locating feature 106 in physical contact with the ring 102. Coupling the ring 102 and the second locating feature in this manner draws the optical center of the image intensifier into a desired alignment relationship with the objective assembly.

It should be understood by those having skill in the art that the description herein above is susceptible to modification and variation without departing from the scope of the invention. The description of the exemplary embodiments should, therefore, not be construed as limiting the scope of the invention as set forth by the appended claims.

What is claimed is:

1. A night vision system comprising:
    a housing;
    an image intensifier contact assembly at least partially disposed in said housing;
    an image intensifier tube at least partially disposed in said image intensifier contact assembly and being radially movable relative thereto;
    a first locating feature affixed to said image intensifier tube and positioned to correct for misalignment between an optical center of the image intensifier tube and an optical axis of the night vision system; and
    a second locating feature coupled to a component of said night vision system and adapted to interact with said first locating feature to to guide said optical center of said image intensifier tube into alignment with said optical axis of the night vision system.

2. The night vision system of claim 1, wherein said first locating feature comprises a ring affixed on a first face of said image intensifier tube.

3. The night vision system of claim 1, wherein said second locating feature is directly coupled to said component of said night vision system.

4. The night vision system of claim 3, wherein said component comprises an objective assembly.

5. The night vision system of claim 1, wherein said first locating feature is affixed to said image intensifier tube with an adhesive.

6. A multi-channel monocular comprising:
    a housing;
    a first image intensifier contact assembly at least partially disposed in said housing;
    a first image intensifier tube at least partially disposed in said first image intensifier contact assembly and being radially movable relative thereto;
    a first locating ring affixed to a distal face of said first image intensifier tube, said first locating ring being concentric with an optical center of said first image intensifier tube;
    a second image intensifier contact assembly at least partially disposed in said housing;
    a second image intensifier tube at least partially disposed in said second image intensifier contact assembly and being radially movable relative thereto;
    a second locating ring affixed to a distal face of said second image intensifier tube, said second locating ring being concentric with an optical center of said second image intensifier tube and
    a first objective assembly;
    a first locating member coupled to said first objective assembly and adapted to mate with said first locating ring of said first image intensifier tube to to guide said optical center of said first image intensifier tube into alignment with an optical axis of said first objective assembly upon mating of said first locating ring with said first locating member;
    a second objective assembly;
    a second locating member coupled to said second objective assembly and adapted to mate with said second locating ring of said second image intensifier tube to to guide said optical center of said second image intensifier tube into alignment with an optical axis of said second objective assembly upon mating of said second locating ring with said second locating member; and
    an eyepiece for combining images provided by the first and second image intensifier tubes.

7. The multi-channel monocular of claim 6, wherein said first locating ring is bonded to said first image intensifier tube.

8. The multi-channel monocular of claim 6, wherein said second locating member includes an orifice adapted to at least partially receive said second locating ring therein.

9. The multi-channel monocular of claim 6, wherein said optical axis of said second objective assembly is transverse to said optical axis of said first objective assembly.

10. A method of aligning an image intensifier tube with an optical axis of a night vision system, said method comprising:
    determining an optical center of said image intensifier tube;
    affixing a first locating feature to said image intensifier tube in a predetermined relationship to said optical center;
    positioning said image intensifier tube at least partially within an image intensifier contact assembly, said image intensifier tube being radially movable relative to said image intensifier contact assembly;

positioning said image intensifier contact assembly in a housing;

providing a second locating feature having a predetermined relationship with said optical axis of said night vision system; and engaging said first locating feature and said second locating feature to guide said optical center of said image intensifier tube into alignment with said optical axis of said night vision system.

* * * * *

UNITED STATES PATENT AND TRADEMARK OFFICE
CERTIFICATE OF CORRECTION

PATENT NO. : 7,294,820 B2
APPLICATION NO. : 10/449734
DATED : November 13, 2007
INVENTOR(S) : Moody et al.

It is certified that error appears in the above-identified patent and that said Letters Patent is hereby corrected as shown below:

In column 5, line 62, in Claim 1, after "feature to" delete "to".

In column 6, line 32, in Claim 6, after "tube to" delete "to".

In column 6, line 40, in Claim 6, after "tube to" delete "to".

Signed and Sealed this

Nineteenth Day of August, 2008

JON W. DUDAS
*Director of the United States Patent and Trademark Office*